United States Patent
Arnold et al.

(10) Patent No.: US 8,056,336 B2
(45) Date of Patent: Nov. 15, 2011

(54) TURBOCHARGER WITH VARIABLE NOZZLE HAVING VANE SEALING SURFACES

(75) Inventors: Philippe Arnold, Hennecourt (FR); Dominique Petitjean, Julienrupt (FR); Anthony Ruquart, Thaon les Vosges (FR); Guillaume Dupont, Thaon les Vosges (FR); Denis Jeckel, Thaon les Vosges (FR)

(73) Assignee: Honeywell International Inc., Morristown, NJ (US)

( * ) Notice: Subject to any disclaimer, the term of this patent is extended or adjusted under 35 U.S.C. 154(b) by 826 days.

(21) Appl. No.: 12/115,245

(22) Filed: May 5, 2008

(65) Prior Publication Data

US 2009/0272112 A1 Nov. 5, 2009

(51) Int. Cl.
| | |
|---|---|
| *F02D 23/00* | (2006.01) |
| *F01B 25/02* | (2006.01) |
| *F01D 17/12* | (2006.01) |
| *F03D 7/00* | (2006.01) |
| *F03D 5/00* | (2006.01) |
| *F03B 1/00* | (2006.01) |
| *F03B 11/02* | (2006.01) |
| *F04D 15/00* | (2006.01) |
| *F04D 27/00* | (2006.01) |
| *F04D 29/44* | (2006.01) |
| *F04D 29/56* | (2006.01) |
| *F04D 29/54* | (2006.01) |

(52) U.S. Cl. .......... 60/602; 415/162; 415/163; 415/164; 415/202; 415/208.1; 415/208.3; 415/209.3; 415/211.1

(58) Field of Classification Search .................... 60/602; 415/159, 160, 161, 162, 163, 164, 208, 208.1, 415/208.3, 209.3, 202, 211.1
See application file for complete search history.

(56) References Cited

U.S. PATENT DOCUMENTS

| | | | | |
|---|---|---|---|---|
| 4,880,351 | A | * | 11/1989 | Inoue et al. .................. 415/164 |
| 7,114,919 | B2 | * | 10/2006 | Scholz et al. ................. 415/164 |

* cited by examiner

*Primary Examiner* — Thomas Denion
*Assistant Examiner* — Cameron Setayesh
(74) *Attorney, Agent, or Firm* — Alston & Bird LLP

(57) ABSTRACT

A variable nozzle for a turbocharger includes a plurality of vanes rotatably mounted on a nozzle ring and disposed in a nozzle flow path defined between the nozzle ring and an opposite nozzle wall. Either or both of the faces of the nozzle ring and nozzle wall include(s) at least one step that defines sealing surfaces positioned to be substantially abutted by airfoil surfaces of the vanes in the closed position of the vanes and to be spaced from the airfoil surfaces in positions other than the closed position. This substantial abutment between the airfoil surfaces and the sealing surfaces serves to substantially prevent exhaust gas from leaking past the ends of the airfoil portions. At the same time, clearances between the nozzle ring face and the end faces of the airfoil portions can be sufficiently large to prevent binding of the vanes under all operating conditions.

14 Claims, 4 Drawing Sheets

TURBOCHARGER WITH VARIABLE NOZZLE HAVING VANE SEALING SURFACES

FEDERALLY SPONSORED RESEARCH OR DEVELOPMENT

This invention was made with United States Government support under DOE Contract No. DE-FC26-06NT42873 awarded by U.S. Department of Energy. The United States Government has certain rights in the invention.

BACKGROUND OF THE INVENTION

The present disclosure relates generally to turbochargers, and relates more particularly to exhaust gas-driven turbochargers having a variable turbine nozzle in the form of an array of vanes that are pivotable about their axes between a closed position and an open position, and any position therebetween, for regulating the flow of exhaust gas through the nozzle to the turbine wheel.

In a typical turbocharger as described above, the vanes are rotatably mounted on a generally annular nozzle ring disposed in the turbocharger surrounding a central axis about which the turbine wheel rotates. The vanes extend between the nozzle ring and an opposite wall defined by an insert disposed in the turbine housing. The nozzle flow path extends between the nozzle ring and the insert, and thus the exhaust gas flows from the turbine housing chamber, radially inwardly between the vanes, and into the turbine wheel. By pivoting the vanes, the effective flow area of the nozzle is varied, thereby regulating the flow of exhaust gas to the turbine wheel.

The vanes are typically mounted on the nozzle ring by way of shafts affixed to one end of the vanes and received in bearing apertures that extend through the nozzle ring. The portions of the vanes exposed to exhaust gas flow in the nozzle are shaped as airfoils whose opposite ends are closely proximate to the faces of the nozzle ring and the opposite insert, respectively. Ideally, the clearance between each end of the airfoil portion and the adjacent face should be zero so that exhaust gas cannot leak through the clearance. However, in practice it is not possible to have zero clearance, or even a very small clearance, because binding would occur between the ends of the airfoil portion and the adjacent faces of the nozzle ring and insert. This is particularly true in view of the thermally induced deformations of the various parts that take place during turbocharger operation. The various parts undergo thermal growth and contraction at different rates and in different amounts.

Accordingly, in practice, the nominal vane clearances typically are designed to be relatively large so as to avoid any possibility of the vanes binding. While the clearances may be smaller at some operating conditions, by design there is still a considerable clearance over the entire expected range of operating conditions. These substantial clearances are known to cause a loss in turbine efficiency. However, it has generally been assumed that such efficiency loss is unavoidable because of the need to prevent any possibility of vane binding.

BRIEF SUMMARY OF THE DISCLOSURE

The present disclosure relates to a turbocharger having a variable nozzle designed to be essentially free of vane binding problems, yet enabling the clearance-induced efficiency loss to be substantially reduced at least at the most-critical operating conditions. More particularly, the variable nozzle is designed to have very small or essentially no clearance when the vanes are in the fully closed position. This operating condition is generally the most critical one in terms of clearance-induced efficiency losses.

In accordance with one aspect of the present disclosure, a turbocharger having a variable nozzle comprises a turbine wheel disposed within a turbine housing, the turbine housing defining an axially extending bore and a generally annular chamber surrounding the bore for receiving exhaust gas from an internal combustion engine. A generally annular nozzle ring is disposed in the turbocharger and defines a plurality of circumferentially spaced bearing apertures extending axially through an axially facing face of the nozzle ring. The nozzle ring is axially spaced from a nozzle wall defining a face opposing the face of the nozzle ring, the opposing faces of the nozzle ring and nozzle wall defining a nozzle flow path therebetween through which exhaust gas in the chamber is directed generally radially inwardly into the turbine wheel. A plurality of circumferentially spaced vanes are disposed in the nozzle flow path, each vane comprising a shaft defining a pivot axis for the vane, the shafts of the vanes being respectively received in the bearing apertures of the nozzle ring and being rotatable therein about the respective pivot axes such that the vanes are adjustable in setting angle between a closed position and an open position.

Each vane includes an aerodynamic airfoil portion having an outer airfoil surface, each airfoil portion being joined to the respective shaft and extending along the pivot axis from a first end to an opposite second end. The first and second ends of each airfoil portion respectively define first and second end faces that are substantially perpendicular to the pivot axis. Clearances exist between the first end faces of the airfoil portions and the face of the nozzle ring and between the second end faces of the airfoil portions and the face of the nozzle wall. In accordance with the present disclosure, these clearances can be of a size designed to avoid binding of the vanes at all operating conditions of interest.

However, to reduce or substantially eliminate clearance-induced efficiency losses when the vanes are closed, at least one of the faces of the nozzle ring and nozzle wall includes at least one step defining sealing surfaces that are positioned to be substantially abutted by the airfoil surfaces in the closed position of the vanes and to be spaced from the airfoil surfaces in positions other than the closed position.

This substantial abutment between the airfoil surfaces and the sealing surfaces serves to substantially prevent exhaust gas from leaking past the ends of the airfoil portions. In this manner, clearance-induced losses are substantially reduced or avoided at the closed vane position where good turbine efficiency is most important.

In one embodiment, the sealing surfaces are configured such that in the closed position of the vanes each point on the airfoil surface that is in substantial abutment with a corresponding point on the sealing surfaces moves into said substantial abutment along a direction that is generally parallel to a normal of the sealing surface at said point. For example, the normals of the sealing surfaces can be generally perpendicular to the pivot axes of the vanes. This arrangement helps to reduce or eliminate any possibility of binding between the vanes and the adjacent face(s) when the vanes are closed.

In one embodiment, each airfoil portion has a suction side and an opposite pressure side and has a leading edge and a trailing edge, and the airfoil surfaces of each vane have a length in a flow direction from the leading edge to the trailing edge, the pivot axis of each vane being located intermediate the leading and trailing edges. The at least one step includes leading-edge step portions positioned to be substantially abutted by leading-edge portions of the airfoil surfaces on the pressure sides of the airfoil portions, and trailing-edge step portions positioned to be substantially abutted by trailing-edge portions of the airfoil surfaces on the suction sides of the airfoil portions.

When the face of the nozzle ring has the at least one step, each vane can have a bearing portion disposed between the first end of the airfoil portion and the shaft. Each bearing portion has a substantially circular outer peripheral surface of larger diameter than the shaft, and the at least one step on the face of the nozzle ring includes medial step portions defining sealing surfaces in substantial abutment with the outer peripheral surfaces of the bearing portions. In this embodiment, the at least one step can comprise a single step that extends as a continuous loop about a circumference of the nozzle ring face and is configured to provide the leading-edge, medial, and trailing-edge step portions for each vane. Alternatively, there can be a separate and discrete step for each vane.

For example, at least one face having the at least one step can define a recess for each vane, wherein the recess substantially conforms in shape to an area swept by the respective airfoil portion when the vane is rotated from the closed position to the open position. Thus, the sealing surfaces are defined by an outer peripheral wall of each recess.

Either or both of the face of the nozzle ring and the face of the nozzle wall can define the at least one step.

The step(s) in the nozzle ring and/or nozzle wall can be manufactured in various ways. For example, the face(s) can be machined (e.g., by milling or grinding) to form the step(s). Alternatively, a stamping process, a fine blanking process, or an electro-erosion process can be used to form the step(s). As yet another possibility, the face(s) can include an abradable coating that is worn away from contact with the vanes during a running-in period, such that the coating is removed in the regions swept by the airfoil portions of the vanes but remains in the other areas of the face, thereby creating steps.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

Figure 5:
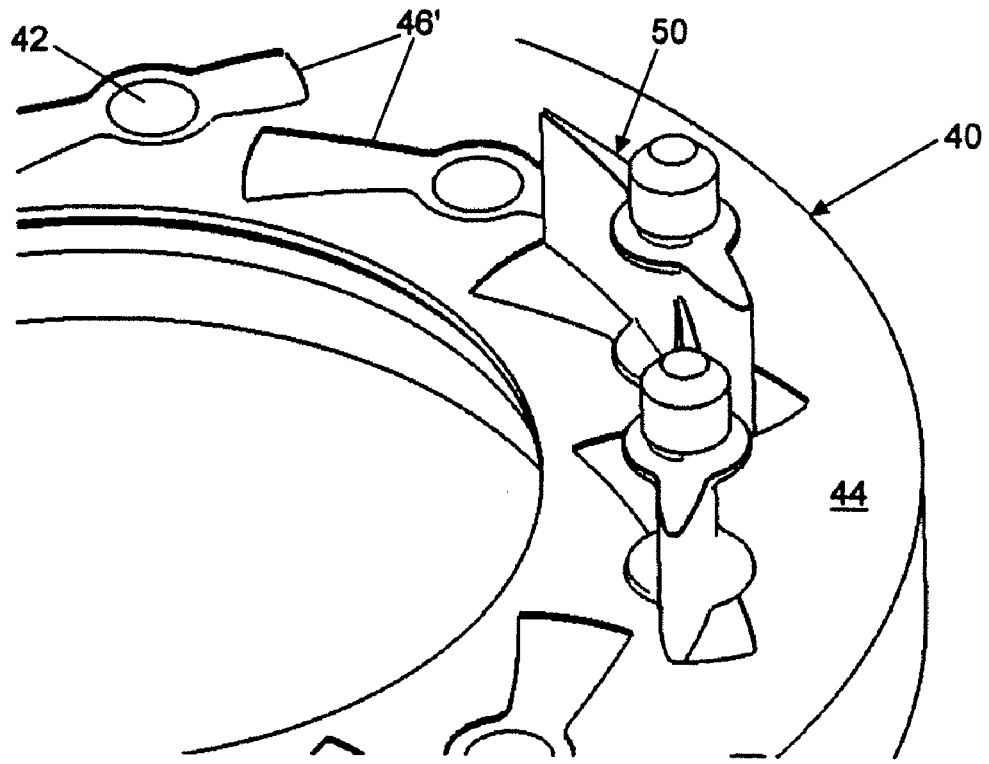
Figure 6:
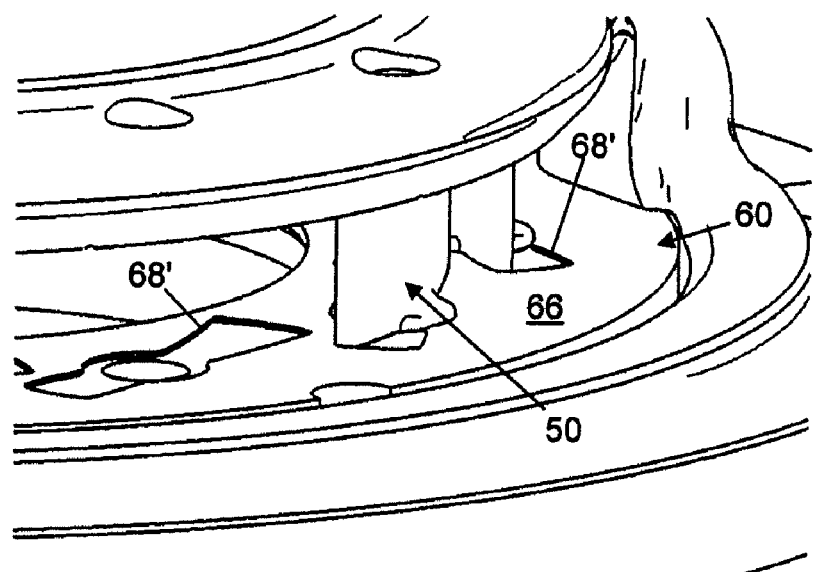

FIG. 5 is an isometric view of a nozzle ring in accordance with another embodiment of the invention, with two vanes rotatably mounted in the nozzle ring and the remaining vanes omitted in order to show details of the nozzle ring; and FIG. 6 is an isometric view of an opposite nozzle wall in accordance with another embodiment of the invention, with two vanes rotatably mounted in the nozzle wall and the remaining vanes omitted in order to show details of the nozzle wall.

DETAILED DESCRIPTION OF THE DRAWINGS

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
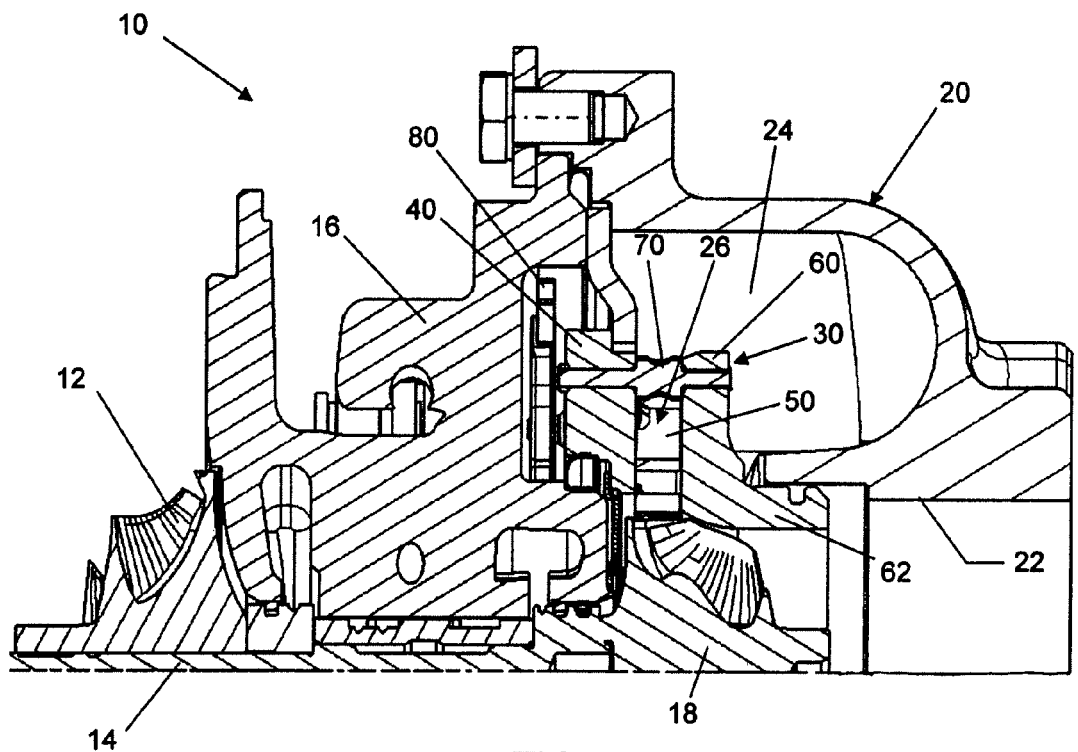
FIG. 1 is an axial cross-sectional view of a turbocharger in accordance with one embodiment of the invention.

FIG. 1 shows a turbocharger 10 in accordance with one embodiment of the invention. The turbocharger includes a compressor wheel 12 mounted on a shaft 14 that extends through a central bore in a center housing 16 and is affixed to a turbine wheel 18. The turbine wheel is mounted in a turbine housing 20. The turbine housing defines an axially extending bore 22 as well as a generally annular volute or chamber 24 that is radially outward of and surrounds the bore 22. The turbine housing also defines an inlet (not visible in FIG. 1) for admitting exhaust gas from an internal combustion engine into the chamber 24. The exhaust gas flows from the chamber radially inwardly through a nozzle 26 and impinges on and flows through the blade passages of the turbine wheel 18, thereby driving the turbine wheel, which in turn drives the compressor wheel 12. The turbocharger also includes a compressor housing (not shown) defining a volute for receiving the air pressurized by the compressor wheel, the pressurized air then being fed to the air intake system of the internal combustion engine.

The nozzle 26 includes a variable vane assembly 30 by which the rate of exhaust gas flow through the nozzle can be regulated in order to regulate the amount of power produced by the turbine, and thus the amount of pressurization achieved by the compressor. The variable vane assembly includes a generally annular nozzle ring 40 disposed between the center housing 16 and turbine housing 20. The nozzle ring is substantially coaxial with the rotational axis of the shaft 14. The variable vane assembly further includes a plurality of vanes 50 rotatably mounted to the nozzle ring in a circumferentially spaced array. The vanes extend generally axially within the flow path of the nozzle 26, between the nozzle ring 40 and an opposite nozzle wall. In the illustrated embodiment, the opposite nozzle wall is defined by an insert 60 having a generally tubular portion 62 that is sealingly inserted into the bore 22 of the turbine housing. However, in other embodiments, the opposite nozzle wall can be defined by a portion of the turbine housing. The nozzle ring 40 has a face 44 that is substantially planar and faces axially toward the opposite nozzle wall defined by the insert 60. The insert similarly has a face 66 that is substantially planar and faces axially toward the nozzle ring.

Figure 2:
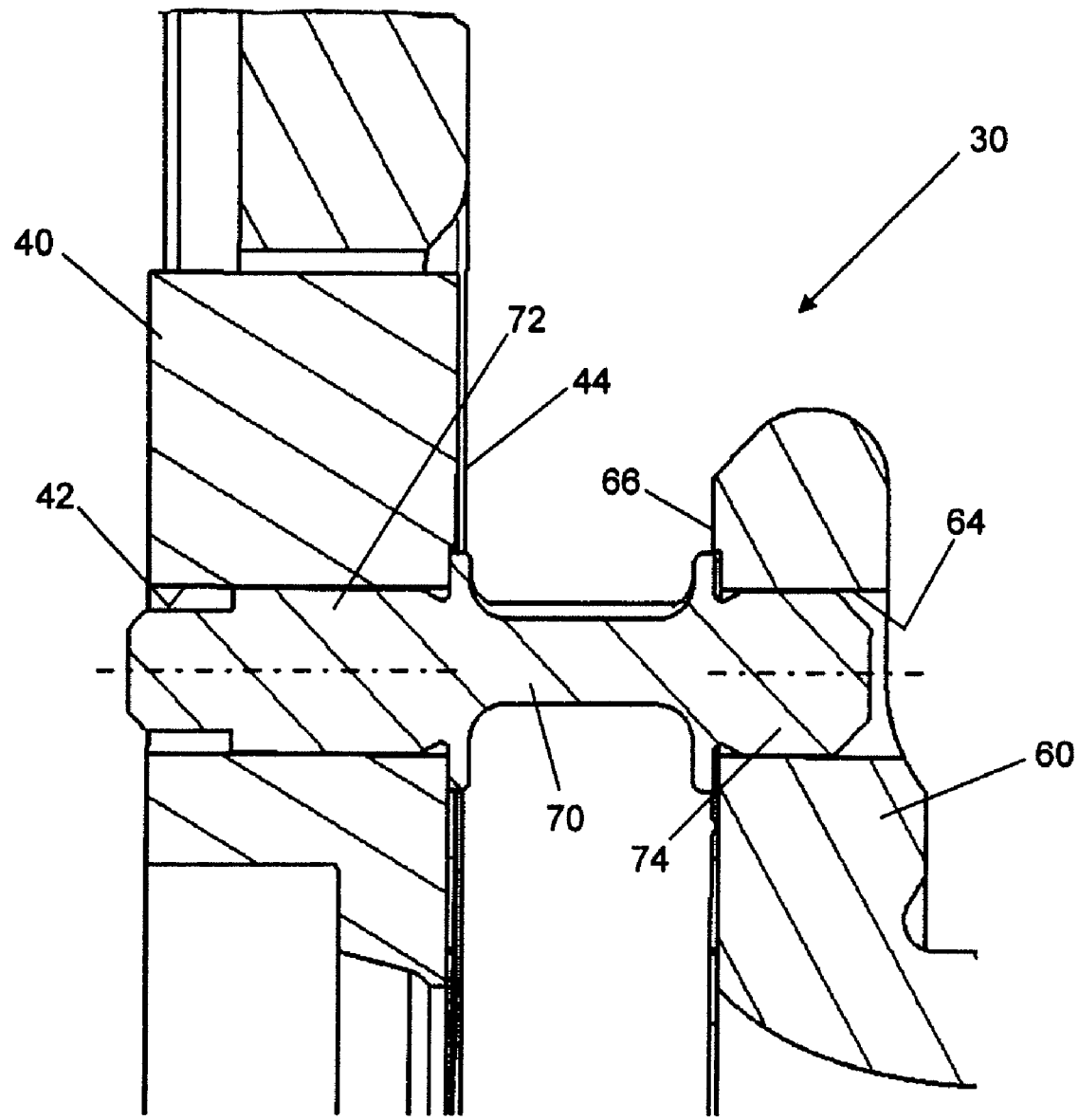
FIG. 2 is an axial cross-sectional view, on an enlarged scale, showing a variable nozzle in accordance with one embodiment of the invention.

FIG. 2 shows the variable vane assembly 30 in greater detail. Each vane is rigidly mounted on a shaft 70. Each shaft has a portion 72 that extends through a cylinder bearing aperture 42 in the nozzle ring. The shafts 70 are rotatable within the bearing apertures 42 for varying the setting angles of the vanes 50. As shown, each of the shafts can also (but need not necessarily) have an opposite end portion 74 that extends through a corresponding cylindrical bearing aperture 64 in the insert 60 (or nozzle wall), so that each vane is supported at both ends rather than being cantilevered from the nozzle ring. Each shaft 70 also includes a first bearing portion 76 and a second bearing portion 78. The bearing portions 76 and 78 are of larger diameter than the rest of the shaft, and have substantially planar surfaces for bearing against corresponding substantially planar surfaces of the nozzle ring 40 and insert 60, respectively.

With reference to FIG. 1, the portion 72 of each shaft extending through the bearing aperture 42 in the nozzle ring 40 is rigidly affixed to a vane arm (not readily visible in FIG.

1). The vane arms are engaged by a rotatable unison ring 80 such that rotation of the unison ring in one direction or the opposite direction causes the vane arms to pivot in one direction or the opposite direction, which in turn cause the vanes 50 to pivot in one direction or the opposite direction. A suitable actuator and linkage (not shown) is used for rotating the unison ring.

Figure 3:
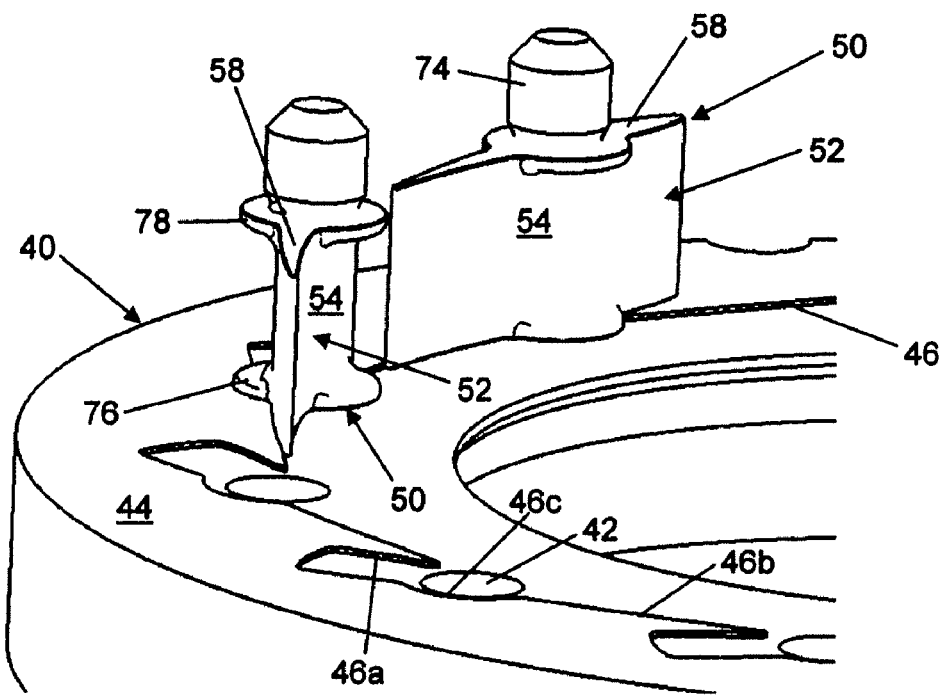
FIG. 3 is an isometric view of a nozzle ring in accordance with one embodiment of the invention, with two vanes rotatably mounted in the nozzle ring and the remaining vanes omitted in order to show details of the nozzle ring.
Figure 4:
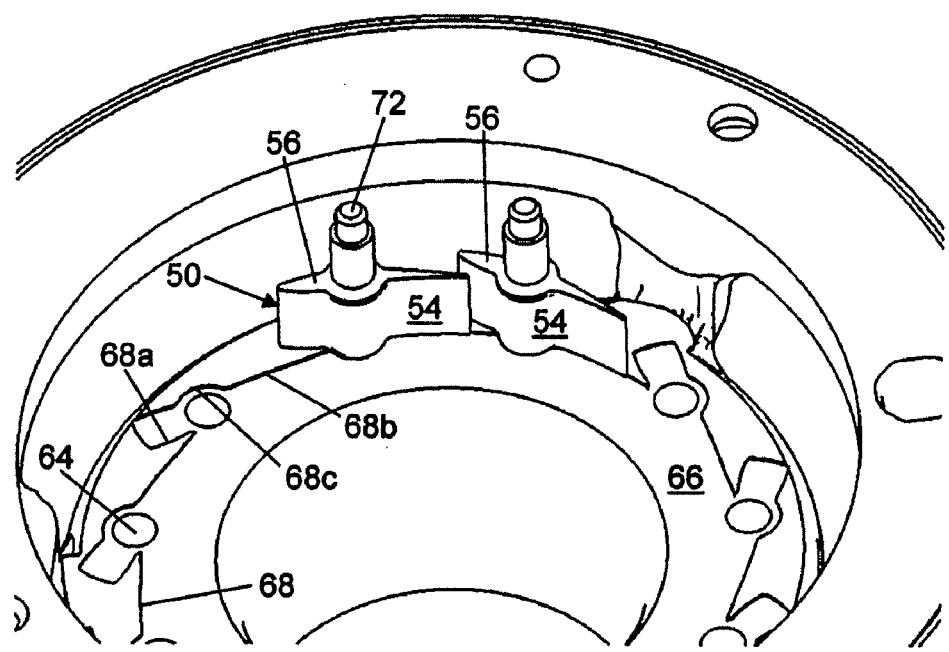
FIG. 4 is an isometric view of an opposite nozzle wall in accordance with one embodiment of the invention, with two vanes rotatably mounted in the nozzle wall and the remaining vanes omitted in order to show details of the nozzle wall.

As best seen in FIGS. 3 and 4, showing a first embodiment of the invention, each vane 50 includes an aerodynamic airfoil portion 52 having an outer airfoil surface 54. Each airfoil portion is joined to the respective shaft 70 and extends along the pivot axis defined by the shaft, from a first end to an opposite second end. The first end of each airfoil portion 54, which is adjacent the nozzle ring 50, defines a first end face 56 (FIG. 4) that is substantially perpendicular to the pivot axis. The second end of each airfoil portion, adjacent the insert 60, defines a second end face 58 (FIG. 3) that is substantially perpendicular to the pivot axis.

Clearances exist between the first end faces 56 of the airfoil portions and the face 44 of the nozzle ring, and between the second end faces 58 of the airfoil portions and the face 66 of the insert or nozzle wall. It is necessary to have a certain amount of clearance at the vane end faces in order to prevent the possibility of binding of the vanes when the various parts of the variable vane assembly are exposed to heating and cooling during operation of the turbocharger. Prior to the invention, such relatively substantial clearances resulted in significant turbine efficiency losses, which are particularly problematic when the vanes are in their closed position (i.e., rotated to a position in which the flow passages between the vanes have a minimum flow area).

In accordance with the present invention, the clearance-induced efficiency losses when the vanes are closed can be substantially reduced or eliminated, as now explained with reference to FIGS. 3 and 4. More particularly, at least one of the faces 44, 66 of the nozzle ring and nozzle wall includes at least one step that defines sealing surfaces positioned to be substantially abutted by the airfoil surfaces 54 of the vanes in the closed position of the vanes, and to be spaced from the airfoil surfaces in positions other than the closed position. Thus, as shown in FIG. 3, the face 44 of the nozzle ring 40 includes a step 46 configured as a continuous step extending about the circumferential of the nozzle ring, and shaped to have portions that substantially conform to and are substantially abutted by portions of the vane airfoil surfaces 54 when the vanes are closed. Specifically, the step 46 includes step portions 46a configured and positioned for engaging the airfoil surfaces 54 along the leading edge region of the "pressure side" (i.e., the generally concave side) of each vane. The step also includes portions 46b configured and positioned for engaging the airfoil surfaces 54 along the trailing edge region of the "suction side" (i.e., the generally convex side) of each vane. Additionally, the step includes medial portions 46c configured and positioned for engaging the peripheral surfaces of the bearing portions 76 of the vanes. At least parts of the medial portion 46c are circular-arc in configuration and coaxial with the pivot axes of the vanes, such that such parts of the medial step portions 46c can substantially abut the circular peripheral surfaces of the vane bearing portions 76 in all positions of the vanes.

The substantial abutment between the sealing surfaces defined by the step 46 and the airfoil surfaces 54 and bearing portions 76 serves to effectively prevent or at least substantially reduce leakage of exhaust gas past the end faces 56 of the vanes when the vanes are closed. In this manner, the clearance-induced efficiency losses at the critical closed-vane position can be substantially reduced.

While having the step on only one of the nozzle faces is advantageous, it is of course preferred for the step to be defined on both faces. Thus, as shown in FIG. 4, the face 66 of the insert 60 includes a step 68. The step 68 includes step portions 68a configured and positioned for engaging the airfoil surfaces 54 along the leading edge region of the "pressure side" of each vane. The step also includes portions 68b configured and positioned for engaging the airfoil surfaces 54 along the trailing edge region of the "suction side" of each vane. Additionally, the step includes medial portions 68c configured and positioned for engaging the peripheral surfaces of the bearing portions 78 of the vanes. At least parts of the medial portion 68c are circular-arc in configuration and coaxial with the pivot axes of the vanes, such that such parts of the medial step portions 68c can substantially abut the circular peripheral surfaces of the vane bearing portions 78 in all positions of the vanes.

The sealing surfaces defined by the steps 46, 68 are configured to avoid binding between the vanes and the steps. Binding typically comes about because of a shearing engagement between two surfaces, wherein one surface comes into engagement with the other surface by moving along a direction that is substantially parallel to a plane of one or both of the surfaces (i.e., along a direction substantially perpendicular to a normal of one or both of the surfaces). Advantageously, the sealing surfaces of the steps 46, 68 are configured such that each point on the airfoil surface 54 that is in substantial abutment with a corresponding point on the sealing surfaces in the closed vane position moves into said substantial abutment along a direction that is generally parallel to a normal of the sealing surface at that point. Stated differently, the airfoil surfaces do not approach and engage the sealing surfaces of the steps in a shearing manner, but rather in a non-shearing manner. This helps to ensure that there will not be any binding between the vanes and the steps. In one embodiment, the sealing surfaces have surface normals that are generally perpendicular to the pivot axes of the vanes.

An alternative embodiment of the invention is now described with reference to FIGS. 5 and 6. In this embodiment, the nozzle ring 40 has a plurality of separate and discrete steps 46', one for each vane 50. Each step 46' proceeds about a closed-loop path encompassing a region of the nozzle ring face 44 that is swept by the vane end face 56 when the vane moves from its closed position to its open position. Thus, in effect, the face 44 defines a plurality of recesses, one per vane, and the steps 46' are the outer peripheral walls of the recesses. Each recess includes at least the part of the face 44 swept by the airfoil, although the recess could be larger than the area swept by the airfoil. As in the prior embodiment, the steps 46' include leading edge, trailing edge, and medial portions for engaging corresponding portions of the vane airfoil surfaces and bearing portions.

Similarly, the opposite nozzle wall or insert 60 includes steps 68' formed as closed-loop paths encompassing at least the regions of the face 66 swept by the airfoil portions of the vanes, thereby in effect defining recesses in the face 66.

Various other configurations of steps can be used in the practice of the present invention. The primary requirement is that the steps define sealing surfaces that in the closed-vane position abut or substantially abut the airfoil surfaces 54 rather than the end faces 56, 58 of the vanes.

The steps can be provided via various manufacturing techniques. For example, the face(s) can be machined (e.g., by milling or grinding) to form the step(s). Alternatively, a stamping process, a fine blanking process, or an electro-erosion process can be used to form the step(s). As yet another possibility, the face(s) can include an abradable coating that is worn away from contact with the vanes during a running-in period, such that the coating is removed in the regions swept by the airfoil portions of the vanes but remains in the other areas of the face, thereby creating steps.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A variable nozzle for a turbocharger, comprising:
   a generally annular nozzle ring defining a plurality of circumferentially spaced bearing apertures extending axially through an axially facing face of the nozzle ring;
   a nozzle wall defining a face axially spaced from and opposing the face of the nozzle ring, a nozzle flow path being defined between the opposing faces of the nozzle ring and nozzle wall; and
   a plurality of circumferentially spaced vanes disposed in the nozzle flow path, each vane comprising a shaft defining a pivot axis for the vane, the shafts of the vanes being respectively received in the bearing apertures of the nozzle ring and being rotatable therein about the respective pivot axes such that the vanes are adjustable in setting angle between a closed position and an open position, each vane including an aerodynamic airfoil portion having an outer airfoil surface, each airfoil portion being joined to the respective shaft and extending along the pivot axis from a first end to an opposite second end, the first and second ends of each airfoil portion respectively defining first and second end faces that are substantially perpendicular to the pivot axis, clearances existing between the first end faces of the airfoil portions and the face of the nozzle ring and between the second end faces of the airfoil portions and the face of the nozzle wall, wherein each airfoil portion has a suction side and an opposite pressure side and has a leading edge and a trailing edge, and the airfoil surfaces of each vane have a length in a flow direction from the leading edge to the trailing edge, the pivot axis of each vane being located intermediate the leading and trailing edges;
   wherein at least the face of the nozzle ring includes at least one step defining sealing surfaces that are positioned to be substantially abutted by the airfoil surfaces in the closed position of the vanes and to be spaced from the airfoil surfaces in positions other than the closed position, and wherein the at least one step includes leading-edge step portions positioned to be substantially abutted by leading-edge portions of the airfoil surfaces on the pressure sides of the airfoil portions, and trailing-edge step portions positioned to be substantially abutted by trailing-edge portions of the airfoil surfaces on the suction sides of the airfoil portions;
   wherein each vane has a bearing portion disposed between the first end of the airfoil portion and the shaft, the bearing portion having a substantially circular outer peripheral surface of larger diameter than the shaft, and wherein the at least one step in the face of the nozzle ring includes medial step portions defining sealing surfaces in substantial abutment with the outer peripheral surfaces of the bearing portions.

2. The variable nozzle of claim 1, wherein the sealing surfaces are configured such that each point on the airfoil surface that is in substantial abutment with a corresponding point on the sealing surfaces in the closed position moves into said substantial abutment along a direction that is generally parallel to a normal of the sealing surface at said point.

3. The variable nozzle of claim 2, wherein the sealing surfaces have surface normals that are generally perpendicular to the pivot axes of the vanes.

4. The variable nozzle of claim 1, wherein the at least one step comprises a single step that extends as a continuous loop about a circumference of the nozzle ring face and is configured to provide the leading-edge, medial, and trailing-edge step portions for each vane.

5. The variable nozzle of claim 1, wherein the face having the at least one step defines a recess for each vane, the recess substantially conforming in shape to an area swept by the respective airfoil portion when the vane is rotated from the closed position to the open position, the sealing surfaces being defined by an outer peripheral wall of each recess.

6. The variable nozzle of claim 1, wherein the face of the nozzle wall includes the at least one step.

7. The variable nozzle of claim 1, wherein the faces of the nozzle ring and nozzle wall both define recesses for the vanes, each recess substantially conforming in shape to an area swept by the respective airfoil portion when the vane is rotated from the closed position to the open position, the sealing surfaces on the nozzle ring and nozzle wall being defined by an outer peripheral wall of each recess.

8. A turbocharger having a variable nozzle, the turbocharger comprising:
   a turbine wheel disposed within a turbine housing, the turbine housing defining an axially extending bore and a generally annular chamber surrounding the bore for receiving exhaust gas from an internal combustion engine;
   a generally annular nozzle ring defining a plurality of circumferentially spaced bearing apertures extending axially through an axially facing face of the nozzle ring;
   a nozzle wall defining a face axially spaced from and opposing the face of the nozzle ring, the opposing faces of the nozzle ring and nozzle wall defining a nozzle flow path therebetween through which exhaust gas in the chamber is directed generally radially inwardly into the turbine wheel; and
   a plurality of circumferentially spaced vanes disposed in the nozzle flow path, each vane comprising a shaft defining a pivot axis for the vane, the shafts of the vanes being respectively received in the bearing apertures of the nozzle ring and being rotatable therein about the respective pivot axes such that the vanes are adjustable in setting angle between a closed position and an open position, each vane including an aerodynamic airfoil portion having an outer airfoil surface, each airfoil portion being joined to the respective shaft and extending along the pivot axis from a first end to an opposite second end, the first and second ends of each airfoil portion respectively defining first and second end faces that are substantially perpendicular to the pivot axis, clearances existing between the first end faces of the airfoil portions and the face of the nozzle ring and between the second end faces of the airfoil portions and the face of the nozzle wall, wherein each airfoil portion has a suction side and an opposite pressure side and has a leading edge and a trailing edge, and the airfoil surfaces of each vane have a length in a flow direction from the leading edge to the trailing edge, the pivot axis of each vane being located intermediate the leading and trailing edges;

wherein at least the face of the nozzle ring includes at least one step defining sealing surfaces that are positioned to be substantially abutted by the airfoil surfaces in the closed position of the vanes and to be spaced from the airfoil surfaces in positions other than the closed position, and wherein the at least one step includes leading-edge step portions positioned to be substantially abutted by leading-edge portions of the airfoil surfaces on the pressure sides of the airfoil portions, and trailing-edge step portions positioned to be substantially abutted by trailing-edge portions of the airfoil surfaces on the suction sides of the airfoil portions;

wherein each vane has a bearing portion disposed between the first end of the airfoil portion and the shaft, the bearing portion having a substantially circular outer peripheral surface of larger diameter than the shaft, and wherein the at least one step includes medial step portions defining sealing surfaces in substantial abutment with the outer peripheral surfaces of the bearing portions.

9. The turbocharger of claim 8, wherein the sealing surfaces are configured such that in the closed position of the vanes each point on the airfoil surface that is in substantial abutment with a corresponding point on the sealing surfaces moves into said substantial abutment along a direction that is generally parallel to a normal of the sealing surface at said point.

10. The turbocharger of claim 9, wherein said normals of the sealing surfaces are generally perpendicular to the pivot axes of the vanes.

11. The turbocharger of claim 8, wherein the face having the at least one step defines a recess for each vane, the recess substantially conforming in shape to an area swept by the respective airfoil portion when the vane is rotated from the closed position to the open position, the sealing surfaces being defined by an outer peripheral wall of each recess.

12. The turbocharger of claim 8, wherein the face of the nozzle wall defines the at least one step.

13. The turbocharger of claim 8, wherein the at least one step comprises a single step that extends as a continuous loop about a circumference of the respective face.

14. The turbocharger of claim 8, wherein the at least one step comprises a plurality of separate and discrete steps, one per vane.

* * * * *